United States Patent
Kannengiesser

(10) Patent No.: US 12,479,152 B2
(45) Date of Patent: *Nov. 25, 2025

(54) METHOD FOR HEATING A PREFORM AND CORRESPONDING METHOD FOR FORMING A CONTAINER

(71) Applicant: SOCIETE DES PRODUITS NESTLE S.A., Vevey (CH)

(72) Inventor: Damien Jean-Philippe Kannengiesser, Golbey (FR)

(73) Assignee: Societe des Produits Nestle S.A., Vevey (CH)

( * ) Notice: Subject to any disclaimer, the term of this patent is extended or adjusted under 35 U.S.C. 154(b) by 60 days.

This patent is subject to a terminal disclaimer.

(21) Appl. No.: 18/040,203

(22) PCT Filed: Jul. 30, 2021

(86) PCT No.: PCT/EP2021/071390
§ 371 (c)(1),
(2) Date: Feb. 1, 2023

(87) PCT Pub. No.: WO2022/029028
PCT Pub. Date: Feb. 10, 2022

(65) Prior Publication Data
US 2023/0311402 A1    Oct. 5, 2023

(30) Foreign Application Priority Data
Aug. 3, 2020 (EP) .................................... 20189149

(51) Int. Cl.
*B29C 49/64* (2006.01)
*B29C 35/08* (2006.01)
(Continued)

(52) U.S. Cl.
CPC ...... *B29C 49/6452* (2022.05); *B29C 35/0805* (2013.01); *B29C 49/12* (2013.01);
(Continued)

(58) Field of Classification Search
CPC ............ B29C 49/6452; B29C 49/6418; B29C 49/071; B29C 49/42119; B29C 49/6458;
(Continued)

(56) References Cited

U.S. PATENT DOCUMENTS 6,113,840 A    9/2000  Emmer et al.
6,287,507 B1   9/2001  Appel et al.
(Continued)

FOREIGN PATENT DOCUMENTS

CN   110065215 A    7/2019
CN   110312607 A   10/2019
(Continued)

OTHER PUBLICATIONS

European Office Action for Appl No. 21 752 060.0-1014 dated Mar. 25, 2025, 9 pages.
(Continued)

*Primary Examiner* — Galen H Hauth
*Assistant Examiner* — Baileigh Kate Darnell
(74) *Attorney, Agent, or Firm* — K&L Gates LLP

(57) ABSTRACT

A method for heating a preform (1) comprising a body portion (4) extending along a longitudinal axis (A1). The method comprises the following steps: —introducing the preform (1) into a heating apparatus (5) comprising an array of infrared emitters (50) arranged in multiple columns (Cj) and rows (Ri); —setting power levels of the infrared emitters (50) so as to divide said array into subsets of columns (SCn); and—heating the preform while translating it in a direction parallel to the rows (Ri), and simultaneously rotating it around its longitudinal axis, the rotation and
(Continued)

translation speeds, and the power levels of the infrared emitters (50) being set so that the power levels of the subsets of columns (SCn) facing zones (42) of the body portion extending longitudinally are different from the power levels of the subsets of columns facing the rest of the body portion, said zones extending relative to one another in a polygonal array.

8 Claims, 10 Drawing Sheets

(51) Int. Cl.
  *B29C 49/12* (2006.01)
  *B29C 49/42* (2006.01)
  *B29L 31/00* (2006.01)

(52) U.S. Cl.
  CPC .. *B29C 49/6418* (2013.01); *B29C 2035/0822* (2013.01); *B29L 2031/7158* (2013.01)

(58) Field of Classification Search
  CPC ... B29C 49/685; B29C 49/06; B29C 35/0805; B29C 2035/0822; B29C 2049/024; B29C 2049/78675; B29C 2949/0715
  See application file for complete search history.

(56) References Cited

U.S. PATENT DOCUMENTS

| | | | |
|---|---|---|---|
| 2010/0007061 A1* | 1/2010 | Feuilloley | B29B 13/024 392/407 |
| 2010/0127435 A1 | 5/2010 | Feuilloley | |
| 2013/0193622 A1 | 8/2013 | Feuilloley et al. | |
| 2019/0118409 A1* | 4/2019 | Witz | B29C 49/071 |

FOREIGN PATENT DOCUMENTS

| | | |
|---|---|---|
| EP | 2253452 | 11/2010 |
| FR | 2964901 A1 | 3/2012 |
| GB | 2545065 | 6/2017 |

OTHER PUBLICATIONS

Chinese Office Action for Appl No. 202180059968.X dated Aug. 21, 2025, 9 pages.

\* cited by examiner

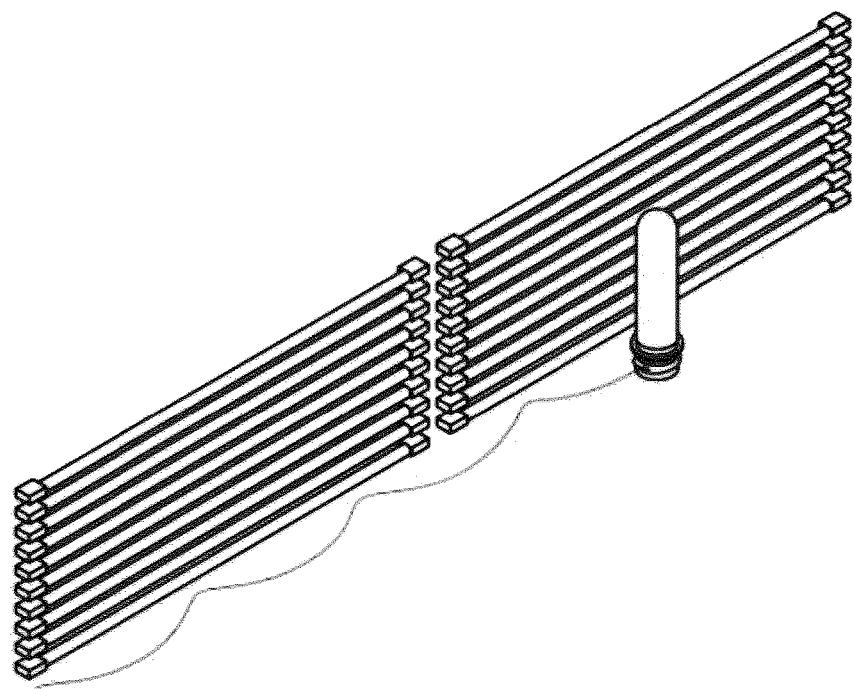
Fig. 1A
Prior art
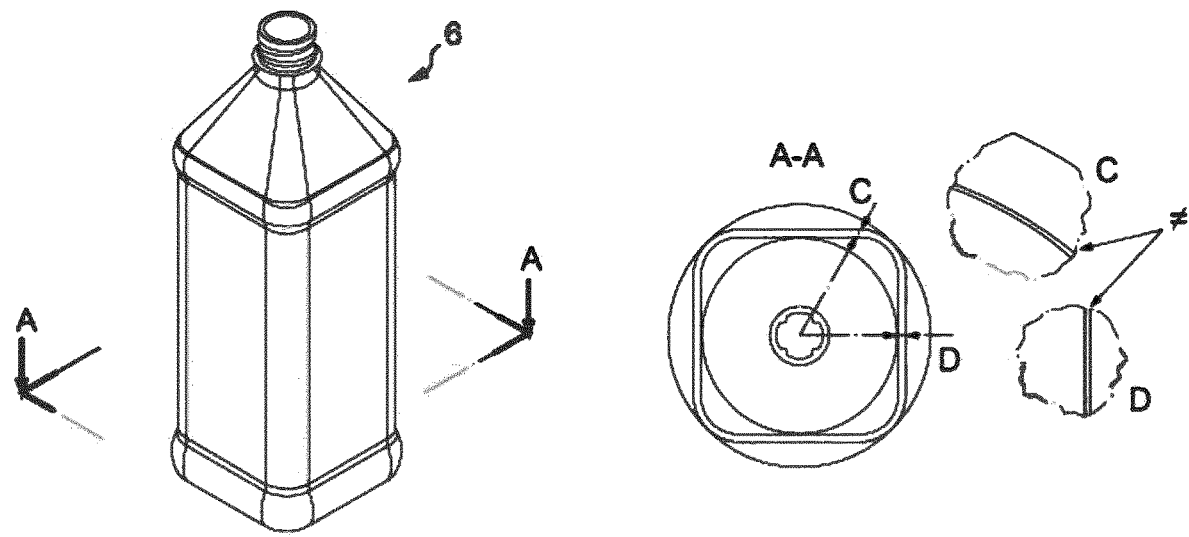
Fig. 1B
Prior art
Fig. 1C
Prior art

Fig. 8
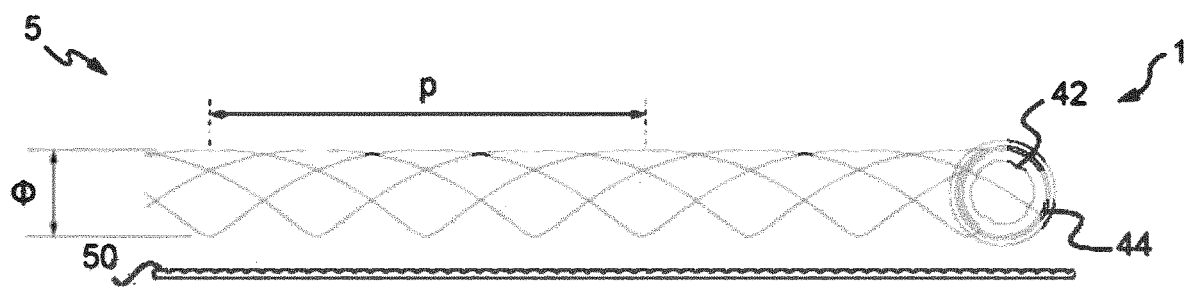
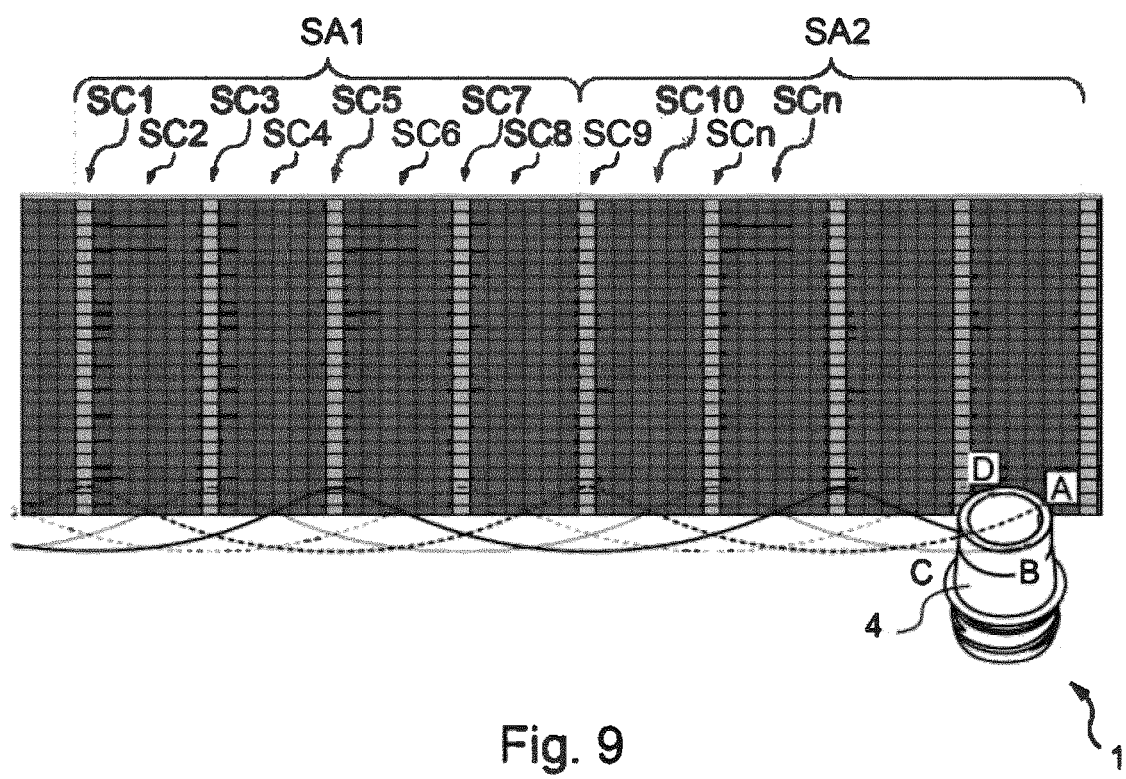
Fig. 9

METHOD FOR HEATING A PREFORM AND CORRESPONDING METHOD FOR FORMING A CONTAINER

CROSS REFERENCE TO RELATED APPLICATIONS

The present application is a National Stage of International Application No. PCT/EP2021/071390, filed on Jul. 30, 2021, which claims priority to European Patent Application No. 20189149.6, filed on Aug. 3, 2020, the entire contents of which are being incorporated herein by reference.

FIELD OF THE INVENTION

The present invention concerns a method for heating a preform and a method for forming a container.

BACKGROUND OF THE INVENTION

The bottles, used to store a product such as a liquid, that are commercially available are mainly manufactured starting from a preform to which a desired shape is given. The preform is a hollow element, generally having the shape of a test tube and made of a thermoplastic resin such as PET Polyethylene terephthalate.

The bottles are usually manufactured by using a method comprising the following steps: injection, heating and stretch blow-moulding of a preform.

The first step of injection consists of injecting the thermoplastic resin in a mould such as to create the preform. Then, in the second step, the preform is heated at a temperature below their recrystallization point. Finally, in a third step, the bottle is created by blow-moulding the preform.

In most state of the art, the heating step is carried out using a heating apparatus comprising halogen lamps, as represented at FIG. 1a. The preform passes in front of the halogen lamps to be heated prior to be blown.

While this solution for heating can be satisfactory to manufacture cylindrical bottles, it presents drawbacks when it comes to manufacture a bottle with a polygonal contour. By "polygonal contour" is meant a bottle with a base having a substantially prismatic shape.

Polygonal bottles, for instance rectangular ones, provide a better volume ratio compared with cylindrical bottles. This shape is also advantageous for storage or transport as it helps increasing the number of bottles on a pallet, a shelf, etc.

The heating solutions known in the state of art, and in particular the halogen lamps, do not enable the manufacture of a rectangular bottle having a homogeneous thickness. This is illustrated in FIG. 1b in which a rectangular bottle obtained by the heating methods and manufacturing of prior art is depicted. FIG. 1c shows in a transverse cross-section of FIG. 1b, the uneven thickness of the bottle.

SUMMARY OF THE INVENTION

The invention concerns a method for heating a preform comprising an open neck portion at a first end, a closed base portion at a second end, and a body portion extending along a longitudinal axis between the neck portion and the base portion.

According to the invention, the method comprises the following steps:

introducing the preform into a heating apparatus comprising an array of infrared emitters arranged in multiple columns and multiple rows, the preform and said array being disposed such that the longitudinal axis and the columns of the array of infrared emitters are parallel or directed obliquely with respect to each other;

orienting angularly the preform at an input angular position by rotating the preform around the longitudinal axis;

setting power levels of the infrared emitters so as to divide the array of infrared emitters into subsets of columns, each subset of columns generating heat at a different power level from an adjacent subset of columns; and heating the preform with the array of infrared emitters while translating the preform in a direction parallel to the rows of the array at a translation speed, and simultaneously rotating said preform around its longitudinal axis in front of said infrared emitters at a rotation speed.

The rotation speed, the translation speed, the input angular position and the power levels of the infrared emitters are set so that the power levels of the subsets of columns facing at least three zones of the body portion extending longitudinally are different from the power levels of the subsets of columns facing the rest of the body portion, said zones of the body portion extending relative to one another in a polygonal array. The power levels of the subsets of columns facing said zones of the body portion are set higher than the power levels of the subsets of columns facing the rest of the body portion if and only if the said zones of the body portion have a greater thickness than the thickness of the rest of the body portion.

Thanks to the layout of the infrared emitters in array with columns and rows, the preform can be heated at different power levels from one part of the body portion to another. In particular, the zones of the body portion extending relative to one another in a polygonal array can be heated at a different power level from the rest of the body portion of the preform.

By being able to control the power level of each infrared emitter, and setting accordingly the rotation speed, the translation speed and the power levels of the infrared emitters, it is thus possible starting from a preform with a body portion having an uneven thickness, in particular thicker at said longitudinal zones extending relative to one another in a polygonal array, to obtain a homogeneous temperature in the preform. It is also possible, starting from a body portion having a homogeneous thickness along any transverse cross-section to heat less at said longitudinal zones extending relative to one another in a polygonal array, than in the rest of the body portion.

This method for heating provides thus the appropriate heating to said preform which will be further blow-moulded to manufacture a polygonal bottle. Thanks to this method, it is possible to manufacture a polygonal bottle with a homogeneous thickness.

In one embodiment, the number of columns for each subset of columns is determined according to the dimension of the emitters in the direction of the preform translation, the perimeter of the transverse cross-section of the body portion, the translation speed and the rotation speed.

It is thus possible to set these parameters to obtain the appropriate and desired heating of the preform. For example, the parameters can be set such that each point of the preform faces infrared emitters at the same power levels all along its trajectory in the heating apparatus.

In one embodiment, when setting the power levels of the heat generated by the infrared emitters, the array of infrared emitters is divided into sub-arrays, each sub-array comprising a number of subsets of columns equal to twice the number of said longitudinal zones of the body portion, the power levels of said subsets of columns being set by alternating between two different power levels from one subset of columns to an adjacent subset of columns.

This setting of the power levels of the infrared emitters enables for instance an appropriate heating for a preform, at different power level at said longitudinal zones extending relative to one another in a polygonal array than in the rest of the body portion.

In one embodiment, the power levels of the infrared emitters of all the sub-arrays are set similarly.

Thanks to this setting, each point of the preform faces subsets of columns generating heat at the same power levels all along its trajectory in the heating apparatus.

In one embodiment, the method is implemented for heating a preform having a body portion comprising at least three zones extending longitudinally and relative to one another in a polygonal array, said zones presenting a greater thickness than the rest of the body portion. The rotation speed, the translation speed, the input angular position and the power levels of the infrared emitters are set so that the power levels of the subsets of columns facing said zones of the body portion are higher than the power levels of the subsets of columns facing the rest of the body portion.

In one embodiment, the method is implemented for heating a preform comprising a body portion having a uniform thickness along any transverse cross-section. The rotation speed, the translation speed, the input angular position and the power levels of the infrared emitters are set so that the power levels of the subsets of columns facing said zones of the body portion extending longitudinally are different from the power levels of the subsets of columns facing the rest of the body portion, said zones of the body portion extending relative to one another in a polygonal array, the power levels of the subsets of columns facing said zones of the body portion being set lower than the power levels of the subsets of columns facing the rest of the body portion.

In one embodiment, the body portion comprises four zones extending longitudinally and relative to one another in a rectangular array.

In a second aspect, the invention concerns a heating apparatus configured to implement the method for heating presenting the previous features. The heating apparatus comprises:
  an array of infrared emitters arranged in multiple columns and multiple rows; and
  means for holding, orienting the preform at said input angular position, translating along a direction parallel to the rows at a settable translation speed and simultaneously rotating said preform around its longitudinal axis in front of said infrared emitters at a settable rotation speed.

In a third aspect, the invention concerns a method for manufacturing a container, in particular a bottle, using a preform comprising an open neck portion at a first end, a closed base portion at a second end, and a body portion extending along a longitudinal axis between the neck portion and the base portion. The method for manufacturing comprises the following steps:
  heating the preform using the method for heating according presenting the previous features;
  transferring the preform into a container-shaped mould and orienting the preform in said mould such that said each zone of the body portion extending longitudinally and relative to one another in a polygonal array faces a corner of an inner wall of the mould; and
  blow-moulding the heated preform in a mould having a shape of a rectangular bottle, by injecting air so as to make the heated preform stretch and take the shape of the mould.

This method provides a prismatic bottle presenting a homogeneous thickness.

It shall be understood that a homogeneous thickness stands for a constant thickness or a substantially constant thickness, i.e. the variation in a transversal cross-section from one part to another of the bottle does not exceed 20%.

In a fourth aspect, the invention concerns a bottle manufactured by said method for manufacturing.

BRIEF DESCRIPTION OF THE DRAWINGS

Additional features and advantages of the present invention are described in, and will be apparent from, the description of the presently preferred embodiments which are set out below with reference to the drawings in which:

FIG. 1a represents a heating apparatus of the prior art in which a preform is heated;

FIGS. 1b and 1c represents a rectangular bottle manufactured using prior art methods and apparatuses;

FIG. 8 represents the heating apparatus of FIG. 6 along a cross-section plane;

FIG. 9 the heating apparatus of FIG. 6 implementing a method for heating a preform, according to another embodiment of the invention.

DETAILED DESCRIPTION OF THE INVENTION

Figure 2A:
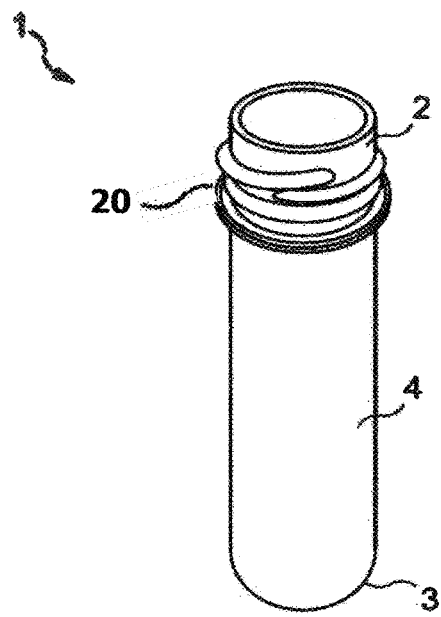
FIGS. 2a, 2b, 2c, 2d represent a first example of a preform used to obtain a rectangular bottle.

FIG. 2a represents an example of a preform 1 used to manufacture a polygonal bottle 6. In particular, the preform 1 is here configured to enable manufacturing of a rectangular bottle. Of course, even though the described embodiments in this document are relative to the manufacturing of a rectangular, it shall not be understood in a restrictive way. As it is explained further, thanks to the method for heating of the invention, it is possible to manufacture a bottle of any prismatic shape, while ensuring a homogeneous thickness for the bottle.

The preform 1 comprises a neck portion 2, a base portion 3 and a body portion 4. The body portion 4 extends between the neck portion 2 and the base portion 3, along a longitudinal axis A1. The preform 1 presents the shape of a test tube. The preform 1 has an inner surface 10 and an outer surface 11 (visible on FIGS. 2c-2d).

The neck portion 2 extends at an open first end 12 of the preform 1. The neck portion 2 has a substantially tubular shape.

The neck portion 2 comprises a threaded part 20. Once the bottle manufactured starting from the preform 1, the threaded part 20 is intended to cooperate with a threaded top able to close the bottle.

The base portion 3 extends at a closed second end 13 of the preform 1. The base portion 3 has a substantially hemispherical shape. The base portion 3 can present a different shape, such as a substantially conical shape, in other embodiments.

The body portion 4 comprises a wall having an inner surface 40 and an outer surface 41. The body portion 4 has here a tubular shape. The inner surface 40 and the outer surface 41 have thus a substantially circular cross-section.

Figure 2B:
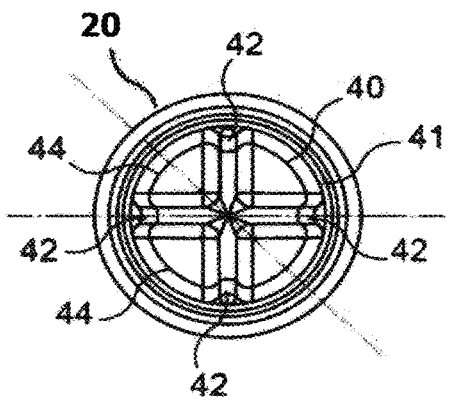
Figure 2C:
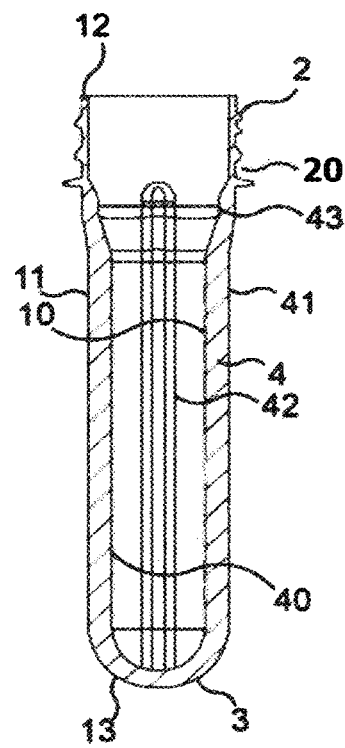
Figure 2D:
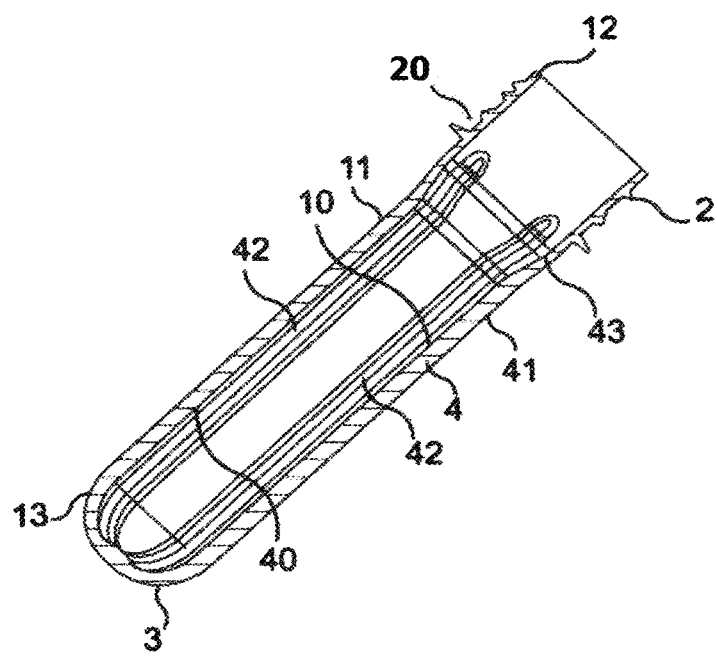

FIG. 2b is a transverse cross-section view of the preform 1 of FIG. 2a. FIGS. 2c, 2d represent longitudinal cross-section views taken respectively along lines A-A and B-B of FIG. 2b.

As it can be seen on these figures, the neck portion 2 and the base portion 3 have respectively a homogeneous thickness. In other words, the dimension taken between an inner surface and an outer surface respectively of the neck portion 2 and the base portion 3 is constant across any transverse cross-section.

In the particular illustrated example, the inner surface 40 and the outer surface 41 of the body portion 4 have coaxial longitudinal axis which coincide with the longitudinal axis A1 of the preform 1.

The body portion 4 comprises four zones 42 of additional thickness. The four zones 42 extend longitudinally and relative to one another in a rectangular array. Rectangular array shall mean that the four zones 42 extend at 90° relative to one another around the preform longitudinal axis A1.

The four zones 42 are here projected zones of the inner surface 40. The four zones 42 present the shape of longitudinal bumps. The four zones 42 of additional thickness extend here from a first end 43 adjacent to the neck portion 2, to the base portion 3.

The thickness of the body portion 4 varies transversally, or along transverse-cross sections. As visible on FIG. 2b, the thickness of the body portion 4 is higher at the four zones 42 than in the rest of the body portion 4. The four zones 42 present here the same thickness.

The rest of the body portion 4 also has the same thickness which is thinner than that of the four zones 42. The rest of the body portion 4 shall be understood as referring to intermediate zones 44 extending between the four zones 42 of additional thickness. The body portion 4 comprises thus four intermediate zones 44.

The thickness of the body portion 4 varies here substantially similarly along any transverse cross-section. Of course, in another embodiment, the thickness of the body portion can vary differently from a transverse cross-section to another.

Figure 3A:
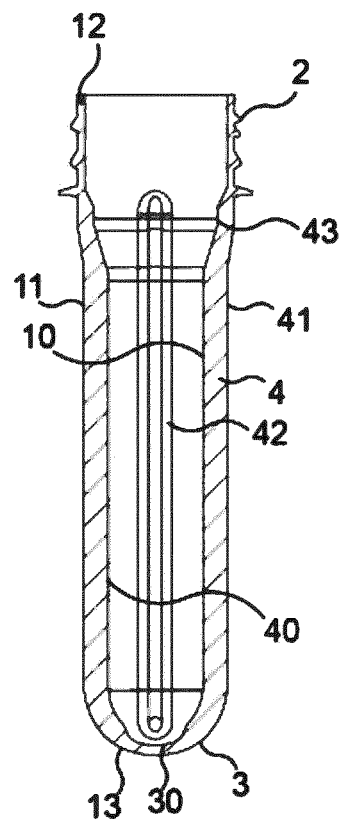
FIGS. 3a, 3b represent a second example of a preform used to obtain a rectangular bottle.
Figure 3B:
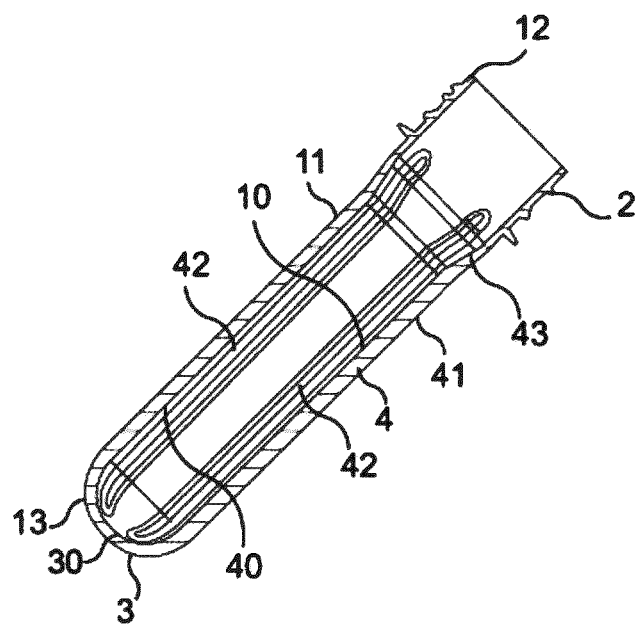

In another embodiment represented at FIGS. 3a, 3b, the four zones 42 of additional thickness do not extend until the base portion 3. Indeed, a space is kept between a bottom 30 of the preform 1 located at the base portion 3 and the four zones 42.

Figure 4A:
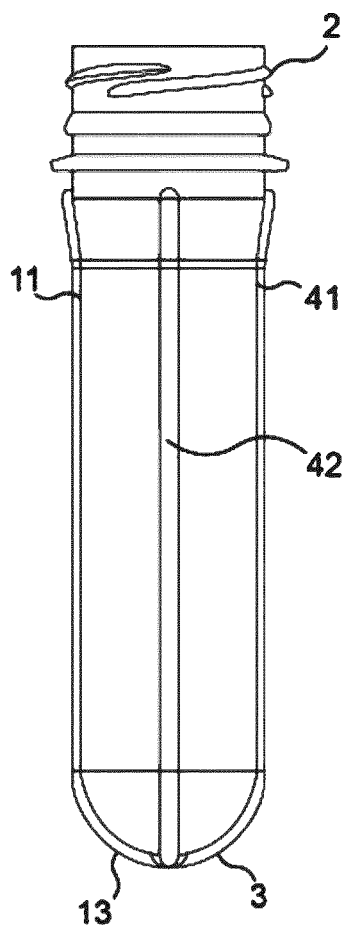
FIGS. 4a, 4b, 4c represent a third example of a preform used to obtain a rectangular bottle.
Figure 4B:
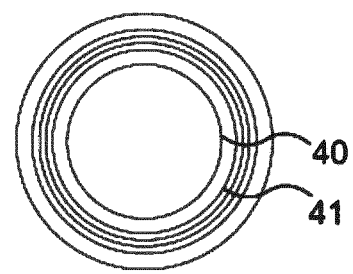
Figure 4C:
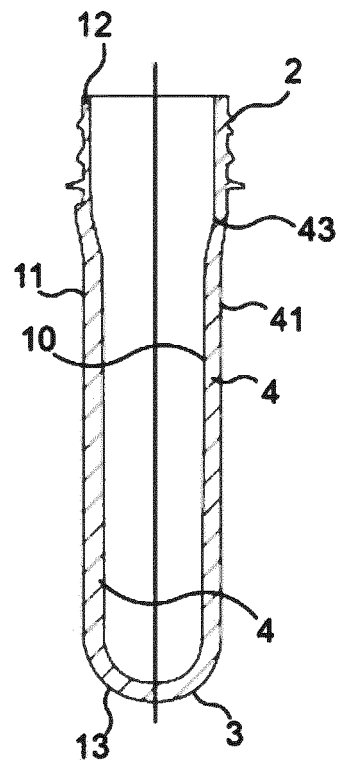
Figure 5A:
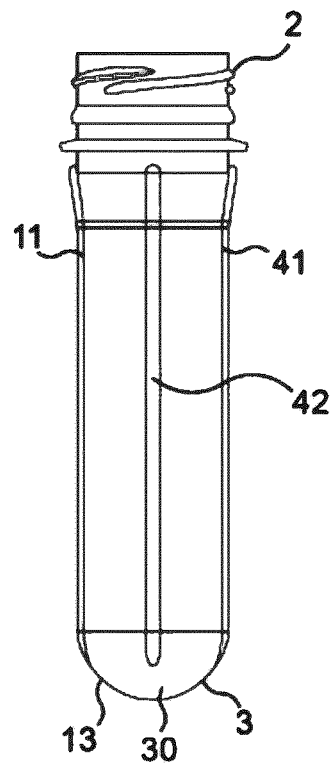
FIGS. 5a, 5b, 5c represent a fourth example of a preform used to obtain a rectangular bottle.
Figure 5B:
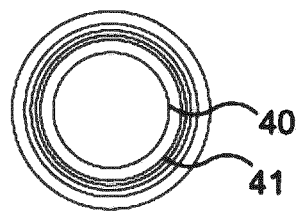
Figure 5C:
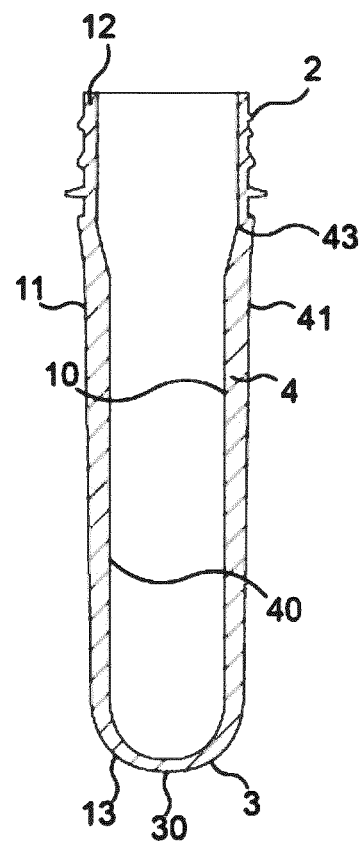

In two other embodiments represented at FIGS. 4a-4c, and 5a-5c, the four zones 42 are projected zones of the outer surface 41. In the embodiment of FIGS. 4a-4c, the four zones 42 extend longitudinally until the bottom 30 of the preform 1 located at the base portion 3. In the embodiment of FIGS. 5a-5c, a space is kept between the bottom 30 of the preform 1 located at the base portion 3 and the four zones 42.

Of course, and as it will be also explained further, the number of longitudinal zones 42 and their shape can vary depending of the desired shape of the bottle. The number of longitudinal zones 42 is at least equal to three to enable manufacturing of a prismatic shaped bottle with a triangular bottom. Preferably, the number of longitudinal zones 42 ranges between three and five. It is thus possible, depending on the number of longitudinal zones 42, to manufacture a bottle having a prismatic shape with a triangular, a quadrilateral, a pentagon bottom, etc.

Figure 6:
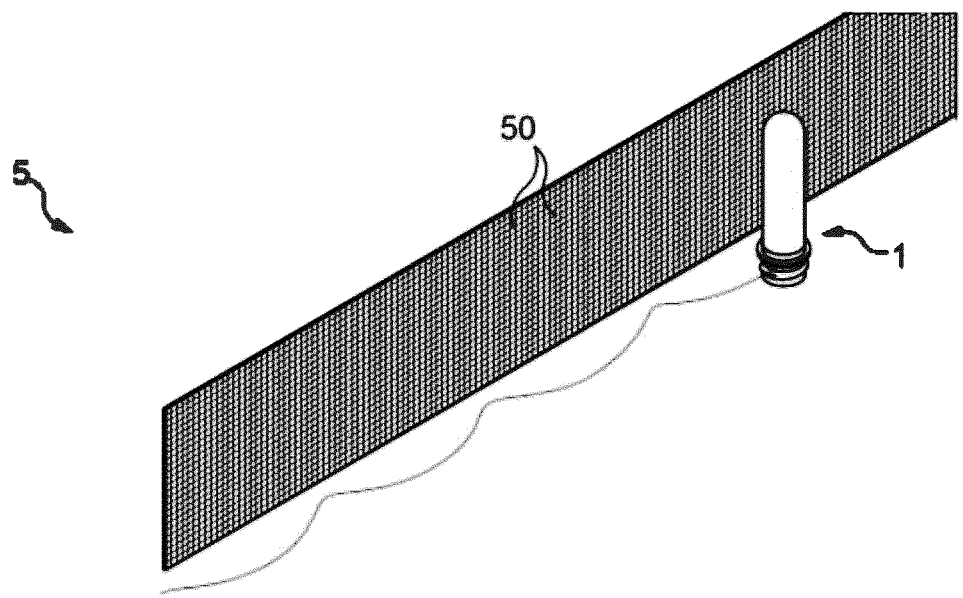
FIG. 6 represents a heating apparatus according to an embodiment of the invention and in which a preform is heated.

FIG. 6 represents a heating apparatus 5 according to an embodiment of the invention and in which a preform 1 is heated.

The heating apparatus 5 comprises several infrared emitters 50 arranged in a matrix layout. In other words, the heating apparatus comprises an array of infrared emitters 50 arranged in multiple rows Ri and multiple columns Cj, with i and j a whole number at least equal to one.

Each infrared emitter 50 can emit heat at a settable power level. The heating apparatus thus comprises setting means (not represented) which enable setting the power levels of the heat emitted by each infrared emitter 50.

The heating apparatus 5 further comprises means for holding, translating along a direction parallel to the rows Ri at a settable translation speed, and simultaneously rotating the preform 1 around its longitudinal axis A1 in front of the infrared emitters 50 at a settable rotation speed. These means are not represented either.

An example of the trajectory of a point of the outer surface 10 of the preform 1 is illustrated. Of course, as will be understood along with the description of the method for heating the preform 1, this trajectory varies according to the dimensions of the preform 1 and in particular the diameter of the outer surface 41 of the body portion 4, the translation speed and the rotation speed.

Thanks to the matrix layout of the infrared emitters 50, the preform 1 can pass in front of several infrared emitters 50 while making a single revolution. This makes possible the use of different power levels from one column Cj to another.

Figure 7:
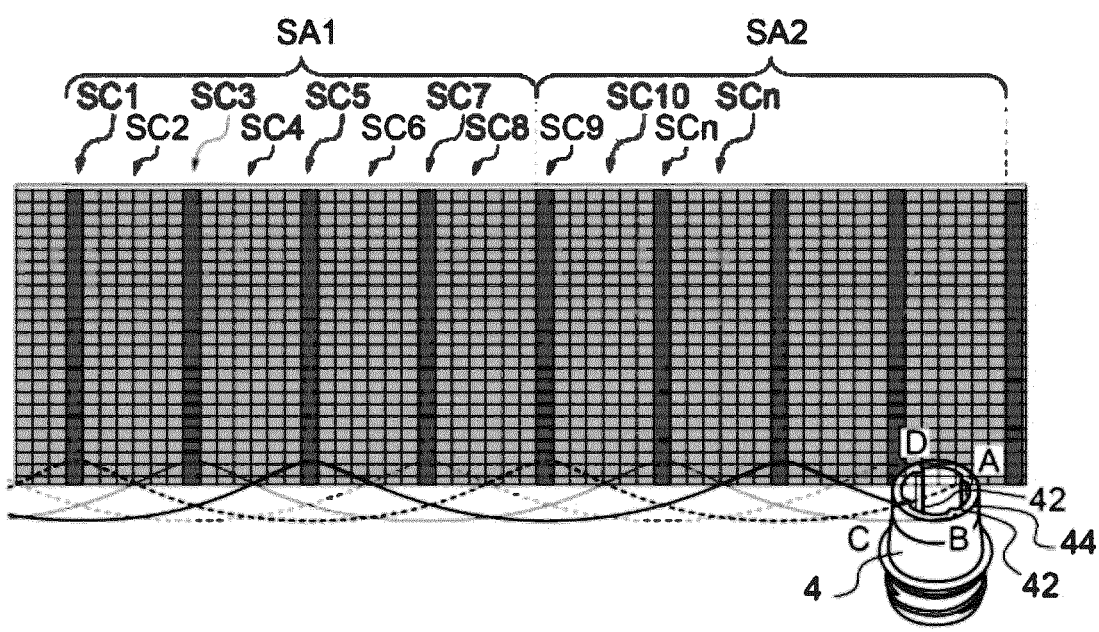
FIG. 7 the heating apparatus of FIG. 6 implementing a method for heating the preform of FIG. 2a, according to an embodiment of the invention.

FIG. 7 represents the heating apparatus 5 of FIG. 6 implementing a method for heating the preform 1 according to an embodiment of the invention. In particular, the method for heating is applied to the preform 1 comprising four zones 42 of additional thickness of FIG. 2a-2d.

The power levels of the infrared emitters 50 are set such that to divide the array of infrared emitters into subsets of columns SCn (n being a whole number at least to one).

In this document, a power level of a subset of columns shall be understood as the sum of power levels of all the infrared emitters 50. Two subsets of columns generating the same power level have their respective infrared emitters generating the same power levels. Two subsets of columns generating the same power level are thus similarly set.

In the illustrated embodiment, all the infrared emitters 50 of the same subset of columns SCn generate heat at the same power level. Thus, all the rows Ri of the same subset of columns SCn generate heat at the same power level. Of course, in another embodiment, not only the power levels of the columns Cj but also the power levels of the rows Ri can vary.

Each subset of columns SCn generates heat at a different power level from an adjacent subset of columns. A subset of columns SCn can comprise one or several columns Cj.

The number of columns Cj for each subset of columns SCn is determined according to the perimeter of the transverse cross-section of the body portion 4, the translation speed and the rotation speed of the preform 1.

In this embodiment, when setting the power levels of the heat generated by the infrared emitters 50, the array of infrared emitters 50 is divided into sub-arrays SAk (k being a whole number at least equal to one). All the sub-arrays SAk comprise for example the same number of columns Cj and rows Ri of infrared emitters 50. In this figure, two sub-arrays SA1, SA2 are represented.

Each sub-array SAk comprises here eight subsets of columns. The subset of columns are thus referenced SCn with i varying here from 1 to 8, and distinguished with shades of grey.

The number of sub-arrays SAk depends on the number of zones 42 of the body portion 4. In particular, each sub-array SAk comprising a number of subsets of columns SCn equal to twice the number of said longitudinal zones 42 of the body portion.

The darker the subset of columns SCn, the highest its power level is, and vice versa. In particular, four subsets of columns, here referenced SC1, SC3, SC5, SC7, are set at a particular power level, and four other subsets of columns, here referenced SC2, SC4, SC6, SC8, are set at a power level lower than said particular power level. In other words, half of the subsets of columns is set at a power level, and the other half of the subsets of columns is set at a different power level, each subset of columns generating heat at a different power level from an adjacent subset of columns.

Each subset of columns generating heat at the highest power level, i.e. SC1, SC3, SC5, SC7 represented in the figure in a dark grey, comprises here one column. Each subset of columns generating heat at the lowest power level, i.e. SC2, SC4, SC6, SC8 represented in the figure in a light grey, comprises here six columns.

The preform 1 is introduced into the heating apparatus 5 and oriented prior to enter the heating apparatus 5 for example by a mechanical block or any appropriate device. The preform 1 is oriented towards the holding means of the heating apparatus 5.

The preform 1 and the array of emitters 50 are disposed such that the longitudinal axis A1 and the columns Cj are parallel or directed obliquely with respect to each other. The longitudinal axis A1 of the preform 1 is thus orthogonal to the rows Ri of the array of emitters 50.

Preferably, the preform 1 is introduced and oriented such that the longitudinal axis A1 extends vertically. The array of emitters 50 are either placed also vertically. The array of emitters 50 is either placed vertically or inclined with respect to the vertical direction. In other words, the columns Cj extend either vertically or inclined with respect to the vertical direction.

Therefore, the preform 1 and the array of emitters 50 are disposed with respect to each other such that the distance between the emitters 50 and the outer surface 11 of the preform 1 facing the emitters 50 is substantially constant at any point of said outer surface 11.

The longitudinal axis A1 and the columns Cj form a projection angle between 0° and 45°, and preferably here between 0° and 25°. In the particular illustrated examples, the longitudinal axis A1 of the preform 1 is parallel to the columns Cj.

The preform 1 is then angularly oriented at an input angular position on the holding means. The preform 1 is angularly oriented such that one of the longitudinal zones 42 of the body portion 4 faces the subset of columns having the highest power level, for instance SC1 here.

The preform 1 is heated with the array of infrared emitters 50 while translating the preform 1 along a direction parallel to the rows Ri of the array at a certain translation speed, and simultaneously rotating the preform 1 around its longitudinal axis A1 in front of the infrared emitters 50 at a certain rotation speed.

The means for orienting the preform 1 at the input angular position and rotating it around the longitudinal axis A1 along the preform's trajectory in the heating apparatus can be one same apparatus or distinct ones.

In this embodiment, the rotation speed, the input angular position, the translation speed and the power levels of the infrared emitters 50 are set so that the heat generated by the subsets of columns SCn facing thicker zones of the body portion 4 is higher than the heat generated by the subsets of columns SCn facing thinner zones of the body portion 4.

In other words, the power levels of the infrared emitters 50 are set so that the heat generated by the subsets of columns SCn facing the four zones 42 of additional thickness of the body portion 4 is higher than the heat generated by the subsets of columns SCn facing the rest of the body portion 4.

In the represented embodiment, for each sub-array SAk, the subsets of columns SC1, SC3, SC5, SC7 generating heat at the highest power level, face the four zones 42 of additional thickness of the body portion 4. In particular, each of the four subsets of columns SC1, SC3, SC5, SC7 faces one different zone of the four zones 42 during the progress of the preform 1 in the heating apparatus 5.

To illustrate this, four cycloids are represented at FIG. 7, and which correspond to the trajectories of four points A, B, C, D of the outer surface 41 of the body portion 4. Each of the four points A, B, C, D belongs to one of the four zones 42 of additional thickness of the body portion 4.

The cycloids of FIG. 7 show thus that points A, B, C, D face all along their trajectory in the heating apparatus the subsets of columns SC1, SC3, SC5, SC7, i.e. the subsets of columns generating heat at the highest power level. In particular, point A faces the subsets of columns SC1, point B faces the subsets of columns SC3, point C faces the subsets of columns SC5, and point D faces the subsets of columns SC7.

The zones of the body portion 4 other than the four zones 42 of additional thickness face all along their trajectory in the heating apparatus 5 the subsets of columns SC2, SC4, SC6, SC8. In other words, the intermediate zones 44 of the body portion 4 face all along their trajectory in the heating apparatus 5 the subsets of columns generating heat at the lowest power level.

The preform 1 is thus being heated in front of the infrared emitters 50 while making only one revolution from one sub-array SAk to another. Therefore in this embodiment, this enables creating a homogeneous temperature on the circumference of the preform 1 despite the variation of the thickness.

Of course, this is applicable to any number of zones 42 of additional thickness of the body portion 4. In other words, if the number of zones 42 of additional thickness of the body portion 4 is different, the heating using the infrared emitters 50 can be changed accordingly. Thus, the heat generated by the subsets of columns SCn facing the zones 42 of additional thickness of the body portion 4 is higher than the heat generated by the subsets of columns SCn facing the rest of the body portion 4.

FIG. 8 is a cross-section of the heating apparatus 5 of FIG. 6 in a plane parallel to the plane in which the preform moves. Three different cycloids are represented. The amplitude φ of the cycloids corresponds to the outer diameter of the body portion 4, i.e. the diameter of the outer surface 41 of the body portion 4. The period p of the cycloids depends on the rotation speed and the translation speed of the preform 1.

Of course, the power levels of the subsets of columns can be set in a different manner is determined depending on the thickness variation of the body portion, the perimeter of the transverse cross-section of the body portion 4, the translation speed and the rotation speed.

FIG. 9 represents the heating apparatus 5 of FIG. 6 implementing a method for heating the preform 1 according to another embodiment of the invention. In particular, the method for heating is applied to the preform 1 comprising a body portion 4 having a uniform or homogeneous thickness along any transverse cross-section.

The embodiment of this figure differs from that of FIG. 7 in the setting of the infrared emitters 50.

The rotation speed, the translation speed, the input angular position and the power levels of the infrared emitters 50 are set so that the heat generated by the subsets of columns SCn facing four zones 42 of the body portion 4 extending longitudinally and respective one another in a rectangular array is different from the heat generated by the subsets of columns facing the rest of the body portion. In particular, the power levels of the infrared emitters 50 are set so that the heat generated by the subsets of columns SCn facing the four zones 42 of the body portion is lower than the heat generated by the subsets of columns SCn facing the rest of the body portion 4.

The four zones 42 present here the same thickness as the rest of the body portion 4.

In the represented embodiment, for each sub-array SAk, the subsets of columns SC1, SC3, SC5, SC7 generating heat at the lowest power level, face the four zones 42 of the body portion 4. In particular, each of the four subsets of columns SC1, SC3, SC5, SC7 faces one different zone of said four zones during the progress of the preform 1 in the heating apparatus 5.

Each subset of columns generating heat at the lowest power level, represented in the figure in a light grey, comprises one column.

Four cycloids are represented at FIG. 9, and which correspond to the trajectories of four points A, B, C, D of the outer surface 41 of the body portion 4. Each of the four points A, B, C, D belongs to one of the four zones 42 of the body portion 4.

The cycloids of FIG. 7 show thus that points A, B, C, D face all along their trajectory in the heating apparatus the subsets of columns SC1, SC3, SC5, SC7, i.e. the subsets of columns generating heat at the lowest power level. In particular, point A faces the subsets of columns SC1, point B faces the subsets of columns SC3, point C faces the subsets of columns SC5, and point D faces the subsets of columns SC7.

The zones of the body portion 4 other than the four zones face all along their trajectory in the heating apparatus 5 the subsets of columns SC2, SC4, SC6, SC8. In other words, the zones of rest of the body portion 4 face all along their trajectory in the heating apparatus the subsets of columns generating heat at the highest power level.

It will be noticed that this setting of the power levels of the infrared emitters 50 is the exact opposite of the setting made in the embodiment of FIG. 7.

Similarly, to the embodiment of FIG. 7, the preform 1 is thus being heated in front of the infrared emitters 50 while making only one revolution from one sub-array SAk to another.

Of course, this is applicable to any number of zones 42 of the body portion 4 depending on the desired shape of bottle. Depending on the number of zones 42, the heating using the infrared emitters 50 can be changed accordingly. Thus, the heat generated by the subsets of columns SCn facing the zones 42 of the body portion 4 is lower than the heat generated by the subsets of columns SCn facing the rest of the body portion 4.

Figure 10A:
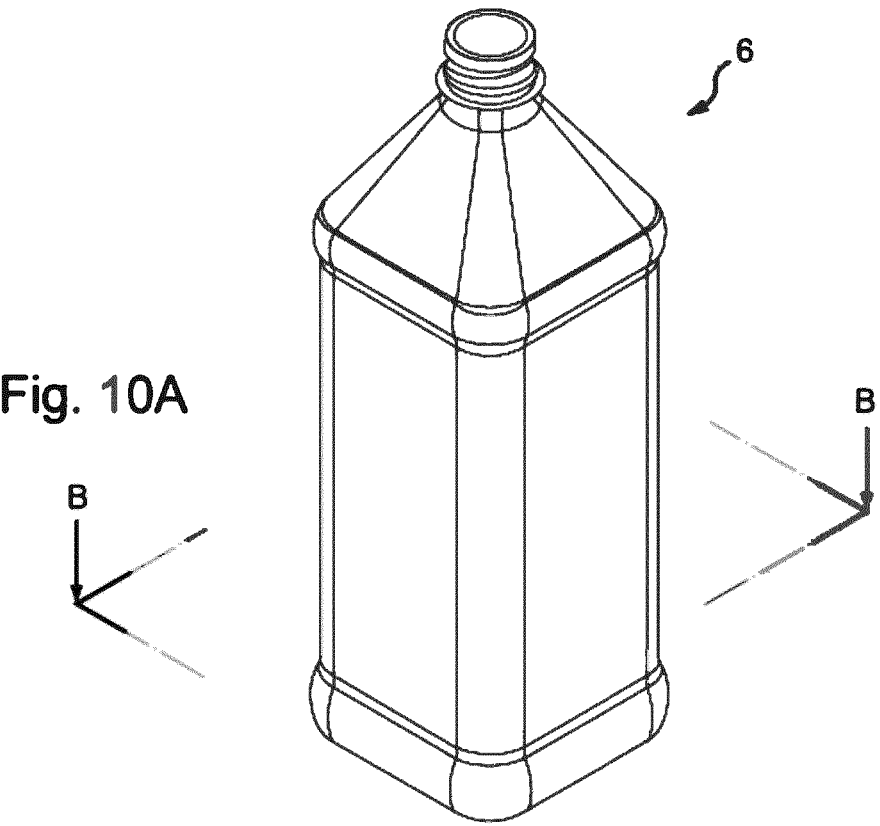
FIGS. 10a, 10b represent a rectangular bottle manufactured using the method and the apparatus for heating according to one embodiment.
Figure 10B:
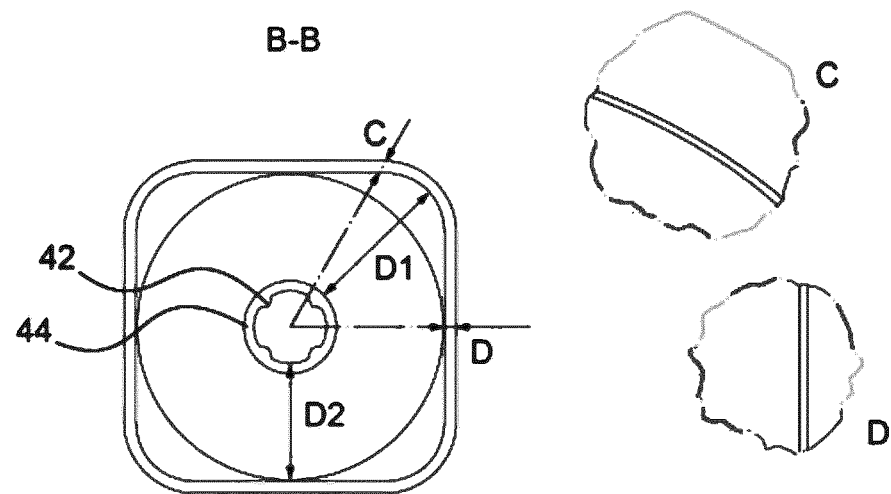

FIG. 10a, 10b represent a rectangular bottle 6 according to an embodiment manufactured using the method and the apparatus for heating.

The method for manufacturing such a bottle 6 comprises a first step heating the preform 1 using the described method for heating. Then in a second step, the heated preform 1 is blow-moulded in a rectangular bottle-shaped mould or any rectangular container-shaped mould, by injecting air so as to make the heated preform 1 stretch and take the shape of the mould.

A transverse cross-section of FIG. 10a as well as the homogeneous thickness of the bottle are for instance depicted in FIG. 10b. Thanks to the heating method implemented in the heating apparatus 5 according to the invention, the prismatic (here rectangular) bottle 6 presents a homogenous thickness compared to the uneven thickness obtained for the bottles of prior art (as shown in FIG. 1c). A transverse cross section of the body portion 4 of the embodiment of FIGS. 2a-2d is also illustrated with the bottle of FIG. 10b, to show that during blow-moulding in a polygonal or rectangular bottle-shaped mould, the preform 1 is oriented at a certain angular position. In particular, the preform is oriented in the mould such that that said each zone of the body portion extending longitudinally and relative to one another in a polygonal array faces a corner of an inner wall of the mould. In the embodiment of FIGS. 2a-2d, each of the four zones 42 of additional thickness is oriented to face a corner of the inner wall of the rectangular mould.

Thus, in this example, the highest is the thickness of a zone of the body portion 4, the longer the distance from said zone to an inner wall of the mould. The four zones 42 of the body portion 4 have a longer distance D1 to cross until the inner wall of the mould than the rest of the body portion 4 which has a smaller distance D2 to cross. There is thus a greater stretching at the four zones 42 than in the rest of the body portion 4.

Of course, the same bottle 6 can be obtained using a preform 1 according to the other illustrated embodiments or using a preform 1 with a body portion 4 having a homogeneous thickness as explained in relation with FIG. 9. The longitudinal zones 42 are also oriented to face the corners of a polygonal mould, but as explained with respect to the embodiment of FIG. 9, said zones 42 are less heated that the rest of the body portion 4.

As the resistance to stretching depends on the temperature, it is thus a matter of heating the preform 1 to obtain the appropriate heating profile whether the thickness of the body portion 4 varies or not.

The invention thus proposes a solution for manufacturing a rectangular bottle having a homogeneous thickness starting from a preform either with a body portion having an uneven thickness or with a body portion having a homogeneous thickness.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The described embodiments are relative to a preform 1 having four longitudinal zones 42 and heated in the aim to manufacture a rectangular bottle. However, the number of zones 42 can be different depending on the shape of the bottle that needs to be manufactured. In particular, the number of zones 42 is equal to the number of sides of the bottom of the prismatic-shaped bottle. For instance, if the bottom shall present a prismatic shape with a triangle bottom, the number of zones 42 will be equal to three. Similarly, if the bottom shall present a prismatic shape with a pentagonal bottom, the number of zones 42 will be equal to five.

The invention claimed is:

1. A method for heating a preform for manufacturing a polygonal bottle from the preform, the preform comprising an open neck portion at a first end, a closed base portion at a second end, and a body portion extending along a longitudinal axis between the neck portion and the base portion, the method comprising the following steps:
   introducing the preform into a heating apparatus comprising an array of infrared emitters arranged in multiple columns and multiple rows, the preform and the array being disposed such that the longitudinal axis and the columns of the array of infrared emitters are parallel or directed obliquely with respect to each other;
   orienting angularly the preform at an input angular position by rotating the preform around the longitudinal axis;
   setting power levels of the infrared emitters so as to divide the array of infrared emitters into subsets of columns, each subset of columns generating heat at a different power level from an adjacent subset of columns;
   heating the preform with the array of infrared emitters while translating the preform in a direction parallel to the rows of the array at a translation speed, and simultaneously rotating the preform around the longitudinal axis in front of the infrared emitters at a rotation speed, and
   the rotation speed, the translation speed, the input angular position, and the power levels of the infrared emitters being set so that the power levels of the subsets of columns facing at least three zones of the body portion extending longitudinally are different from the power levels of the subsets of columns facing the rest of the body portion, the at least three zones of the body portion extending relative to one another in a polygonal array, the power levels of the subsets of columns facing the at least three zones of the body portion being set higher than the power levels of the subsets of columns facing the rest of the body portion if and only if the at least three zones of the body portion have a greater thickness than the thickness of the rest of the body portion; and the at least three zones of the body portion corresponding to the corners of the polygonal bottle.

2. A method for heating according to claim 1, wherein the number of columns for each subset of columns is determined according to the dimension of the emitters in the direction of the preform translation, the perimeter of the transverse cross-section of the body portion, the translation speed and the rotation speed.

3. A method for heating according to claim 1, wherein when setting the power levels of the heat generated by the infrared emitters, the array of infrared emitters is divided into sub-arrays, each sub-arrays comprising a number of subsets of columns equal to twice the number of the at least three zones of the body portion, the power levels of the subsets of columns being set by alternating between two different power levels from one subset of columns to an adjacent subset of columns.

4. A method for heating according to claim 3, wherein the power levels of the infrared emitters of all the sub-arrays are set similarly.

5. A method for heating a preform according to claim 1, wherein the body portion comprising at least three zones extending longitudinally and relative to one another in the polygonal array, the at least three zones presenting a greater thickness than the rest of the body portion, wherein the rotation speed, the translation speed, the input angular position and the power levels of the infrared emitters are set so that the power levels of the subsets of columns facing the at least three zones of the body portion are higher than the power levels of the subsets of columns facing the rest of the body portion.

6. A method for heating a preform according to claim 1, wherein the body portion having a uniform thickness along any transverse cross-section, wherein the rotation speed, the translation speed, the input angular position and the power levels of the infrared emitters are set so that the power levels of the subsets of columns facing the at least three zones of the body portion extending longitudinally are different from the power levels of the subsets of columns facing the rest of the body portion, the at least three zones of the body portion extending relative to one another in a rectangular array, the power levels of the subsets of columns facing the at least three zones of the body portion being set lower than the power levels of the subsets of columns facing the rest of the body portion.

7. A method for heating a preform according to claim 1, wherein the body portion comprises four zones extending longitudinally and relative to one another in a rectangular array.

8. A method for heating a preform for manufacturing a polygonal bottle from the preform, the preform comprising an open neck portion at a first end, a closed base portion at a second end, and a body portion extending along a longitudinal axis between the neck portion and the base portion, the method for manufacturing comprising the following steps:
   introducing the preform into a heating apparatus comprising an array of infrared emitters arranged in multiple columns and multiple rows, the preform and the array being disposed such that the longitudinal axis and the columns of the array of infrared emitters are parallel or directed obliquely with respect to each other;
   orienting angularly the preform at an input angular position by rotating the preform around the longitudinal axis;
   setting power levels of the infrared emitters so as to divide the array of infrared emitters into subsets of columns, each subset of columns generating heat at a different power level from an adjacent subset of columns;
   heating the preform with the array of infrared emitters while translating the preform in a direction parallel to the rows of the array at a translation speed, and simultaneously rotating the preform around a longitudinal axis in front of the infrared emitters at a rotation speed, and the rotation speed, the translation speed, the input angular position and the power levels of the infrared emitters being set so that the power levels of the subsets of columns facing at least three zones of the body portion extending longitudinally are different from the power levels of the subsets of columns facing the rest of the body portion, the at least three zones of the body portion extending relative to one another in a polygonal array, the power levels of the subsets of columns facing the at least three zones of the body portion being set higher than the power levels of the subsets of columns facing the rest of the body portion if and only if the at least three zones of the body portion have a greater thickness than the thickness of the rest of the body portion, and the at least three zones of the body portion corresponding to the corners of the polygonal bottle;

transferring the heated preform into a container-shaped mould and orienting the heated preform in the mould such that each zone of the body portion extending longitudinally and relative to one another in the polygonal array faces a corner of an inner wall of the mould; and blow-moulding the heated preform in a mould having a shape of a polygonal bottle, by injecting air so as to make the heated preform stretch and take the shape of the mould.

* * * * *